July 1, 1924.
S. PICKERING
1,499,870
DRIVING MECHANISM FOR GEARED LOCOMOTIVES
Filed Jan. 18, 1923
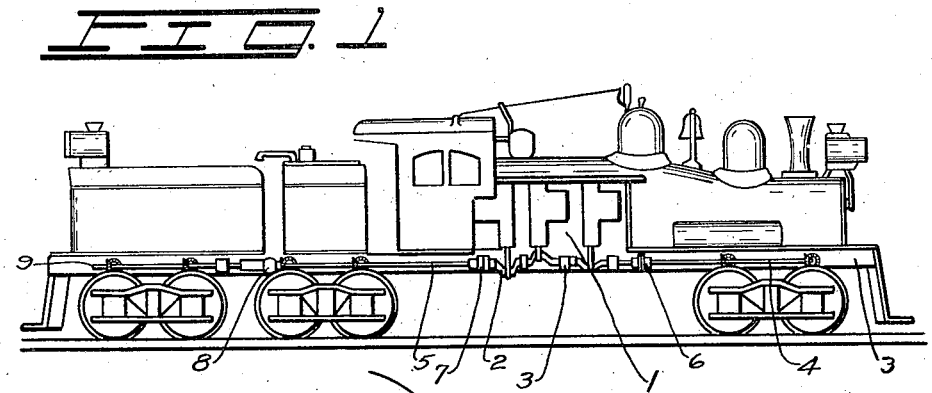
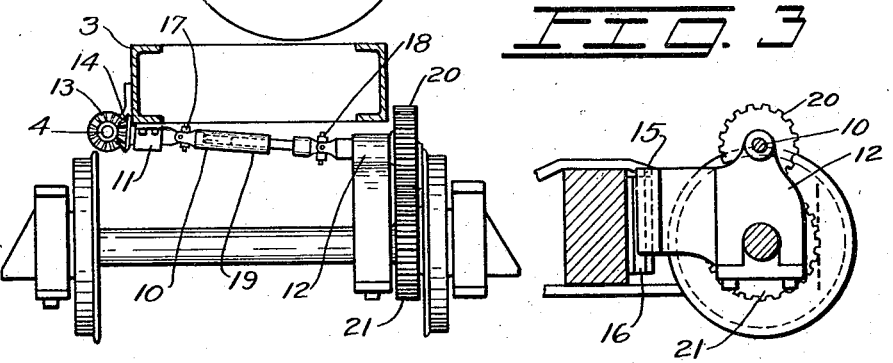
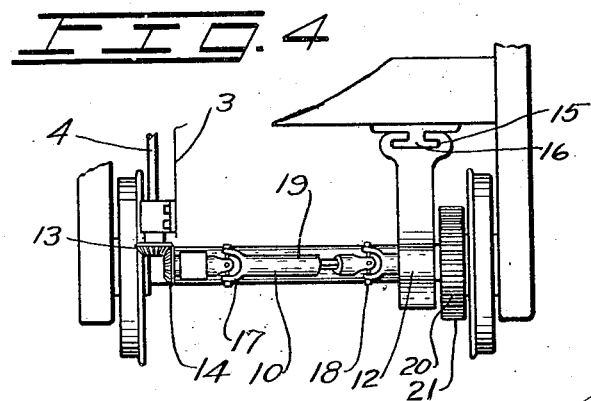
INVENTOR
Samuel Pickering
Harry Bowen
ATTORNEY

Patented July 1, 1924.

1,499,870

UNITED STATES PATENT OFFICE.

SAMUEL PICKERING, OF BELLEVUE, WASHINGTON.

DRIVING MECHANISM FOR GEARED LOCOMOTIVES.

Application filed January 18, 1923. Serial No. 613,397.

*To all whom it may concern:*

Be it known that I, SAMUEL PICKERING, a citizen of the United States, residing at Bellevue, county of King, and State of Washington, have invented new and useful Improvements in the Driving Mechanism for Geared Locomotives; and I do hereby declare that the following is a full, clear, and exact specification, such as will enable others skilled in the art to which it appertains to make and use the same.

The invention is the providing of a positive means for driving geared locomotives whereby the main shaft may be placed on the engine frame so that the bevel gears may remain in a fixed position relative to one another and so that the main shaft may be continued to a third set of trucks through a suitable universal and expansible joint.

The invention is an improvement upon my inventions in the same art as set forth in my patents, the numbers of which are 1,367,714 and 1,386,528 and the dates of which are respectively February 8, 1921, and August 2, 1921.

The object of my invention is to provide a geared drive for locomotives which drives each axle individually and in which the flexible connections are placed in such a position that the gears will remain in fixed positions when the engine goes around a curve or vibrates from a rough track, such as a logging track.

Another object of the invention is to reduce the resistance to curving which is caused by placing the main shaft on the sides of the trucks as this reduces the motive power and causes unnecessary wear on the flanges of the wheels.

Another object of the invention is to place the main driving shaft in a fixed position so that it will not be necessary to weaken it by placing universal and telescoping joints in it.

Another object of the invention is to provide a direct connection between the main driving shaft and the wheels which will be practically in a straight line while under strain and which will at the same time provide a flexible connection between the shaft and the wheel.

Another object of the invention is to provide a means for driving geared locomotives in which the bevel gears may be removed from the wheels and placed in fixed positions on the main frame.

And a further object of the invention is to provide a slidable guide which connects the bearing holding the gear that meshes with the gear on the axle to the bolster.

With these ends in view the invention embodies a locomotive having its boiler placed to one side of the center of the trucks, a vertical engine on one side of the boiler with its crank-shaft on the side of the main frame, the main driving shaft connected to the ends of the crank-shaft by flange couplings, other shafts connected to the main shaft by bevel gears and extending across the trucks above the axles, said shafts having universal and telescoping joints in them and having spur gears on their ends which mesh with other spur gears on the axles, and bearings slidably connected to the bolsters which support the ends of the transverse shafts.

Other features and advantages of the invention will appear from the following description taken in connection with the drawings, wherein:—

Figure 1 is the side elevation of an engine.

Figure 2 is a cross section showing the connection between the main shaft and one of the axles.

Figure 3 is a longitudinal section showing the sliding connection between the transverse shaft and the bolster.

Figure 4 is a plan view showing the flexible shaft and sliding connection.

In the drawings I have shown my locomotive as it would be constructed wherein numeral 1 indicates the vertical engine which is connected to the crank-shaft 2 on the side of the main frame 3. At the forward end of the crank-shaft is a section 4 of the main driving shaft and at the rear of the crank-shaft is another section 5 which drives the rear wheels. These sections are connected to the crank-shaft by the couplings 6 and 7 and the rear end of the section 5 is connected through a universal and expansible joint 8 to a rear section 9 through which the wheels of the tender may be driven.

Above each axle is a transverse shaft 10 as shown in Figure 2 which is supported in bearings 11 and 12 and driven through bevel gears 13 and 14 from the main shaft. The bearing 11 is directly attached to the main frame 3 and the bearing 12 rests upon the axle as shown in Figure 3 and has a groove 15 in one side which slides over a tongue 16 on the side of the bolster so that it may be held in the vertical position and at the same time move upward and downward. The transverse shaft 10 has universal joints 17 and 18 in it and a polygonal or telescoping connection 19 between the joints which provides for lateral movement between the main frame of the truck while the universal joints provide for perpendicular or longitudinal movement.

On the lower end of the transverse shaft 10 is a spur gear 20 which meshes with another spur gear 21 on the axle adjacent the wheel and it will be seen that these will remain in positive engagement at all times. As the journals supporting the axles wear and lateral motion develops in the wheels the teeth of the spur gears will slide laterally in relation to each other and as the face of the gears may be a little more than necessary this movement will not impair their strength.

It will be seen that standard spring truck journals may be used for the axles as the wheels may move laterally or up and down without interfering with the driving mechanism. The boiler may be placed on the side of the center as usual to balance the engine and driving shaft and the remainder of the locomotive may be constructed in the usual manner. It will be seen that with this means for driving, as many of the wheels as may be desired may be driven by inserting transverse shafts 10 and connecting them as shown and described; and the main shaft may be extended to drive the wheels of the tender as shown or may end at the end of the rear truck of the locomotive.

It will be understood that changes may be made in the construction without departing from the spirit of the invention. One of which changes may be in the design of the universal joints 17 and 18 or in the type of telescoping connections 19 as this connection may be made round with a key or with as many sides as may be desired. Another change may be in the use of special gears in place of the gears 20 and 21 which will enable the transverse shaft 10 to be in a straight line or in the making of the gears 20 and 21 of larger diameters so that the center of the gear 20 will raise which will also permit the transverse shaft 10 to be in a straight line. Another change may be in the use of as many cylinders as may be desired and still another may be in the type of couplings between the crank-shaft and the driving shafts, or between the rear section of the driving shaft and the section on the tender.

The construction will be readily understood from the foregoing description. To use the locomotive it may be assembled as shown and described and as it travels over a rough track the wheels may raise and lower and as they move upward or downward the lower end of the transverse shaft 10 will move while the upper end upon which the bevel gear is mounted will remain stationary so that the position between the bevel gears will remain fixed. It will also be seen that as the locomotive passes around a curve the trucks may twist and the lengthening or the shortening of the distance between the spur gears and the bevel gears will be taken care of by the telescoping connection 19 so that the main shaft may remain in a stationary position on the side of the main frame and, therefore, will not be subject to twists or bends or lengthening or shortening which will eliminate the enormous wear that develops in driving shafts of geared locomotives, and which will also increase the motive power by reducing the friction. It will also be seen that by moving the main driving shaft from the ends of the axles to the main frame the resistance to curving will be eliminated and this will reduce the wear on the wheel flanges. The wear in the bevel gears will also be greatly reduced as they are placed in fixed positions. Therefore, it will be seen that with a driving mechanism of this type it will be possible to reduce the wear that develops in a geared locomotive to a minimum because the flexible connections which include universal joints and telescoping members that utilize a great deal of power and cause enormous wear, have been removed from the main driving shaft and placed in the individual axle connections where it is possible to keep them practically in straight lines.

Having thus fully described the invention what I claim as new and desire to secure by Letters Patent, is:—

1. In a locomotive having driving wheels journaled in swinging trucks; driving means for said wheels comprising a gear mounted on the axle meshing with another gear above it and a flexible connection between the upper gear and a pair of bevel gears, one of which is on the main shaft which is mounted on the main frame.

2. A locomotive having wheels mounted in standard trucks; gears on the axles of the wheels; other gears above these gears; journals that are attached to the axles and slidably attached to the bolsters of the trucks for supporting the upper gears; transverse shafts connected to the upper gears through universal joints the opposite ends of which are connected to bevel gears on the main frame through other universal joints; said transverse shafts having telescoping sections in them; and other bevel gears which are mounted on the main driving shaft on the side of the main frame and which mesh with the gears at the ends of the transverse shafts; said locomotive being provided with suitable means for driving the main driving shaft.

3. A locomotive having its boiler placed to one side of the center; steam cylinders on the opposite side of the center with suitable pistons and connecting rods which are connected to a suitable crank-shaft; a main driving shaft connected to the crank-shaft and supported in bearings on the side of the main frame; bevel gears on the main driving shaft which mesh with other bevel gears on the ends of transverse shafts above the axles, said transverse shafts having universal and telescoping joints; spur gears on the opposite ends of the transverse shafts which mesh with spur gears on the axles; and bearings for supporting the ends of the transverse shafts upon which the spur gears are mounted which are slidably connected to the bolsters of the trucks.

4. A locomotive having driving wheels journaled in swinging trucks; a spur gear attached to the inside of the left hand driving gear; a boxing slidably attached to the truck supporting the wheels which has a lower bearing on the driving axle and an upper bearing which supports a stub shaft on which a gear is mounted which meshes with the gear on the inside of the wheel and which has a universal joint attached to its opposite end; a telescoping connection attached to the universal joint which has another universal joint at its opposite end; another stub shaft supported in a bearing on the bottom of the main frame, one end of which is connected to the latter universal joint and the other end of which has a bevel gear on it that meshes with a bevel gear on the main driving shaft on the side of the main frame; and a suitable means for driving the main driving shaft.

5. A locomotive having driving wheels journaled in swinging trucks; driving means for said wheels comprising transverse shafts above the axles having universal and telescoping joints in them, spur gears on one of their ends meshing with similar gears on the axles and bevel gears on their opposite ends meshing with similar gears on the main driving shaft; said main driving shaft being mounted in bearings on the side of the main frame and driven by a vertical engine in the side of the locomotive.

SAMUEL PICKERING.